US009483171B1

(12) United States Patent
Zarraga et al.

(10) Patent No.: US 9,483,171 B1
(45) Date of Patent: Nov. 1, 2016

(54) LOW LATENCY TOUCH INPUT RENDERING

(71) Applicant: AMAZON TECHNOLOGIES, INC., Reno, NV (US)

(72) Inventors: John Aaron Zarraga, San Francisco, CA (US); Bradley James Bozarth, Sunnyvale, CA (US); Ilya Daniel Rosenberg, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 120 days.

(21) Appl. No.: 13/915,274

(22) Filed: Jun. 11, 2013

(51) Int. Cl.
*G06F 3/0488* (2013.01)
*G06F 3/041* (2006.01)

(52) U.S. Cl.
CPC ............. *G06F 3/0488* (2013.01); *G06F 3/041* (2013.01); *G06F 3/0416* (2013.01)

(58) Field of Classification Search
CPC ........ G06F 3/044; G06F 3/03; G06F 3/0412; G06F 3/03545; G06F 3/04883; G06F 3/0488; G06F 3/0416; G06T 1/20; G06T 11/60; G06T 15/06; G06T 2207/20221; G06T 2207/10016
USPC ........................................................ 345/173
See application file for complete search history.

(56) References Cited

U.S. PATENT DOCUMENTS

| | | | | |
|---|---|---|---|---|
| 5,751,276 A * | 5/1998 | Shih ...................... G06F 3/0418 345/178 |
| 6,154,210 A * | 11/2000 | Anderson .............. G03B 17/02 345/173 |
| 6,295,378 B1 * | 9/2001 | Kitakado et al. ............. 382/238 |
| 6,359,616 B1 * | 3/2002 | Ogura ................... G06F 3/0418 178/18.01 |
| 6,518,960 B2 * | 2/2003 | Omura et al. ................ 345/177 |
| 6,622,301 B1 * | 9/2003 | Hirooka .................. G06F 8/452 712/28 |
| 6,624,832 B1 * | 9/2003 | Thomas .............. G06F 3/03545 345/173 |
| 6,720,954 B2 * | 4/2004 | Conzola ................ G06F 3/0488 345/173 |
| 6,957,233 B1 * | 10/2005 | Beezer .................. G06F 17/241 |
| 7,207,422 B2 * | 4/2007 | Takeuchi ................ B66B 1/463 187/391 |
| 7,256,772 B2 * | 8/2007 | Morrison .............. G06F 3/0428 178/18.01 |
| 7,564,448 B2 * | 7/2009 | Yi ....................... G06F 3/04886 178/18.01 |
| 8,135,894 B1 * | 3/2012 | Ball ........................ G06F 13/26 710/264 |
| 8,249,664 B1 * | 8/2012 | Bauer .................... G06F 3/0488 345/173 |
| 8,269,725 B2 * | 9/2012 | Hall ...................... G06F 3/0418 178/18.01 |
| 8,487,889 B2 * | 7/2013 | King ............................ 345/173 |
| 8,624,845 B2 * | 1/2014 | Grivna .................... G06F 3/041 345/104 |
| 2002/0008692 A1 * | 1/2002 | Omura et al. ................. 345/173 |
| 2002/0130847 A1 * | 9/2002 | Conzola ................ G06F 3/0488 345/173 |

(Continued)

*Primary Examiner* — Temesghen Ghebretinsae
*Assistant Examiner* — Michael J Jansen, II
(74) *Attorney, Agent, or Firm* — Lindauer Law, PLLC

(57) ABSTRACT

Devices and techniques to decrease latency in rendering a line or other feature on a display device responsive to input on a touch sensor are described. A touch sensor may detect a touch input with the touch sensor. Touch coordinates indicative of the touch input on the touch sensor are determined. The touch coordinates are mapped to display coordinates associated with the display device. Based on the display coordinates, an operating system kernel may generate a feature, such as a line, for presentation on the display.

20 Claims, 8 Drawing Sheets

(56) References Cited

U.S. PATENT DOCUMENTS

| | | | |
|---|---|---|---|
| 2004/0017375 A1* | 1/2004 | Lui | G06F 17/242 345/581 |
| 2004/0059557 A1* | 3/2004 | Liao | G06F 17/5022 703/13 |
| 2005/0017957 A1* | 1/2005 | Yi | G06F 3/04886 345/173 |
| 2006/0103633 A1* | 5/2006 | Gioeli | G06F 3/03547 345/173 |
| 2006/0119588 A1* | 6/2006 | Yoon et al. | 345/173 |
| 2008/0001923 A1* | 1/2008 | Hall | G06F 3/0418 345/173 |
| 2008/0244468 A1* | 10/2008 | Nishihara | G06F 3/017 715/863 |
| 2009/0149253 A1* | 6/2009 | Kelly | G07F 17/3211 463/36 |
| 2009/0184933 A1* | 7/2009 | Wei-Wen | G06F 3/04817 345/173 |
| 2009/0198839 A1* | 8/2009 | Banerjee | G06F 9/4411 710/10 |
| 2010/0079384 A1* | 4/2010 | Grivna | G06F 3/041 345/173 |
| 2010/0103330 A1* | 4/2010 | Morrison | H04N 9/3185 348/744 |
| 2010/0199226 A1* | 8/2010 | Nurmi | 715/863 |
| 2010/0218144 A1* | 8/2010 | Huotari | 715/863 |
| 2010/0295796 A1* | 11/2010 | Roberts et al. | 345/173 |
| 2011/0012857 A1* | 1/2011 | Irie | G06F 3/0486 345/173 |
| 2011/0122073 A1* | 5/2011 | Chen | G06F 3/0412 345/173 |
| 2011/0128244 A1* | 6/2011 | Cho et al. | 345/173 |
| 2011/0157028 A1* | 6/2011 | Stallings | G06F 3/04883 345/173 |
| 2011/0175821 A1* | 7/2011 | King | 345/173 |
| 2011/0205169 A1* | 8/2011 | Yasutake | G06F 3/03547 345/173 |
| 2011/0254784 A1* | 10/2011 | Yamada | G06F 1/32 345/173 |
| 2011/0310118 A1* | 12/2011 | Asmi | G06F 3/04883 345/619 |
| 2012/0147031 A1* | 6/2012 | Luengen | G06F 8/38 345/619 |
| 2012/0274661 A1* | 11/2012 | Ye | G06F 3/0488 345/629 |
| 2013/0181908 A1* | 7/2013 | Santiago | G06F 3/041 345/173 |
| 2013/0201112 A1* | 8/2013 | Large | G06F 3/04883 345/173 |
| 2013/0241842 A1* | 9/2013 | Ma | 345/173 |
| 2013/0342485 A1* | 12/2013 | Kim | G06F 3/041 345/173 |
| 2013/0346924 A1* | 12/2013 | Morrill | G06F 3/04845 715/863 |
| 2014/0062914 A1* | 3/2014 | Lin | G06F 3/0485 345/173 |
| 2014/0139456 A1* | 5/2014 | Wigdor | G06F 3/0488 345/173 |
| 2014/0143692 A1* | 5/2014 | Wigdor | G06F 3/0488 715/764 |
| 2014/0168096 A1* | 6/2014 | Bathiche | G06F 3/147 345/173 |
| 2014/0306903 A1* | 10/2014 | Huang | G06F 11/3485 345/173 |
| 2014/0313144 A1* | 10/2014 | Seto et al. | 345/173 |
| 2015/0002402 A1* | 1/2015 | Ma | 345/168 |

\* cited by examiner

| Feature characteristics 402 | Feature state data 120(1) | Feature state data 120(2) | Feature state data 120(3) | |
|---|---|---|---|---|
| Line thickness | 5 points | 10 points | 20 points | |
| Line style | Pencil | Felt Tip Pen | Thick Marker | ... |
| Color | BLUE | BLACK | GREEN | |
| Canvas region | (0,0) to (312, 50) | (225, 25) to (535,125) | (225, 25) to (535,125) | |
| Input Object | Any | Stylus | Finger | |

⋮

LOW LATENCY TOUCH INPUT RENDERING

BACKGROUND

Touch input is suitable for gathering user input in a wide variety of applications. Touch input may be used in devices such as mobile phones, personal digital assistants, automatic teller machines, video games, point of sale terminals, and so forth. A lag between touch input received by a touch sensor and output, such as on a display, may result in an unfavorable user experience.

Figure 1:
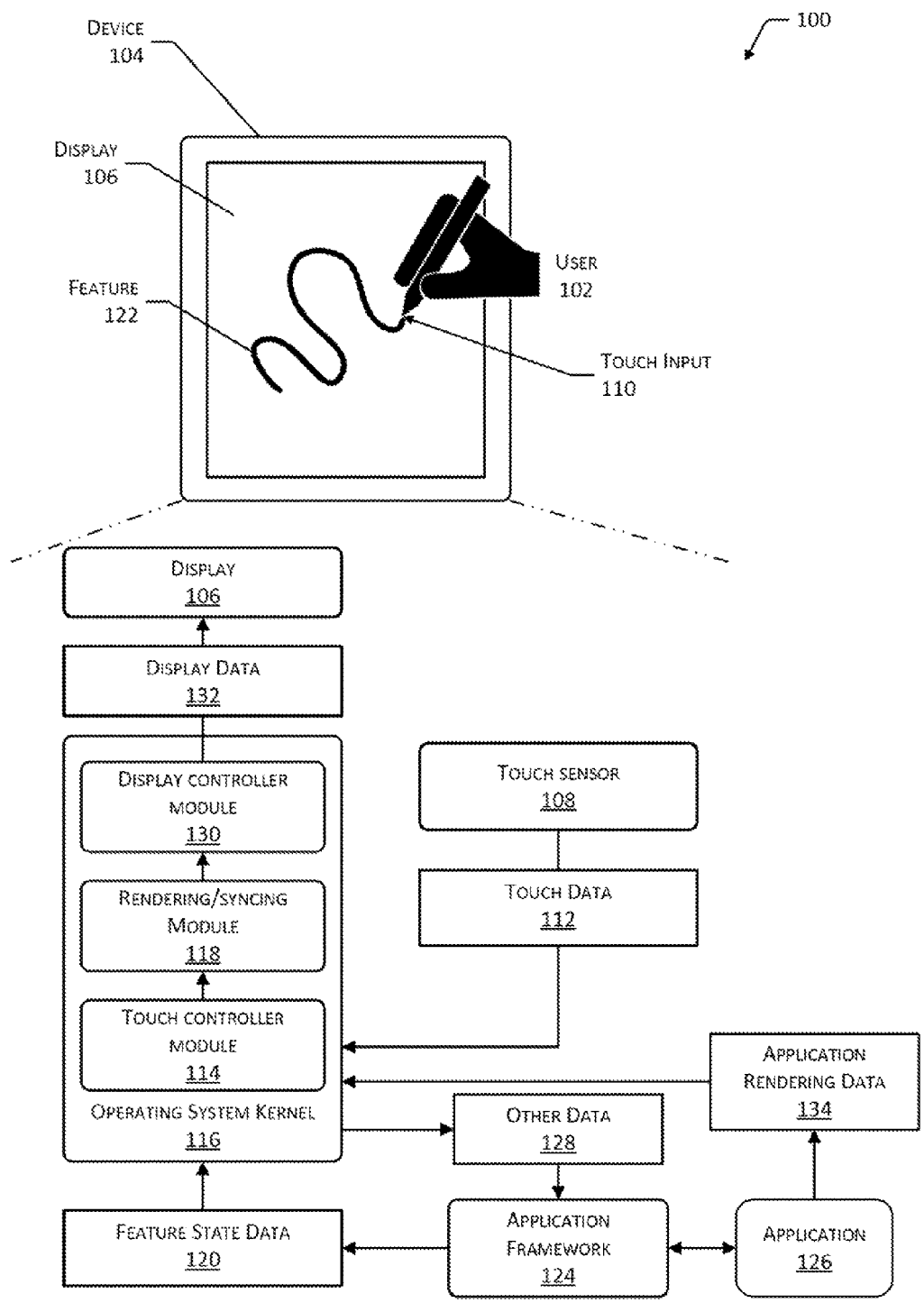
FIG. 1 depicts a system for reducing latency in rendering a line or other feature on a display responsive to input on a touch sensor using a rendering/syncing module.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Due to theft versatility, touch sensors are a popular interface choice for many different types of media devices. These devices may include point-of-sale systems, portable devices, tablet computers, smartphones, in-vehicle control systems, classroom presentation systems, and so forth. A variety of objects such as a finger, stylus, and so forth may be used to allow a user to provide touch input to a touch sensor coupled to the devices and generate touch data.

The touch sensor provides touch data indicative of a location of the touch input, relative to the touch sensor. In some situations, touch data may be used to generate features on a display. For example, a swipe of a stylus on a touchscreen may be configured to draw a feature such as a line which follows a path of the swipe. Time lag, or latency, between the touch and the generation of the feature may be disconcerting. For example, the user may perceive the lag as being an indication that something is not functioning properly.

Traditional systems receive touch input, generate touch data, and pass the touch data along through various portions of an operating system, application framework, and so forth, ultimately to an application. The application may then initiate a process to render the feature. This process may include sending data back through the application framework, various portions of the operating system, and ultimately to a display controller to present the feature on the display. Depending on a variety of factors, including but not limited to processor loading, memory contention, or application design, a significant latency may occur between the touch input and the display output.

This disclosure relates to reducing the latency between the touch input and the display output. A rendering/syncing module receives touch data indicative of the touch input and generates output on a display. The rendering/syncing module may be implemented in one or more operating system components, such as an operating system kernel, an operating system module, a device driver, and so forth executing on the device. This reduces latency and minimizes the time between touch input and display output, as described below.

The touch sensor accepts the touch input, which may include one or more points of activating the touch sensor. For example, a finger, a stylus, or other object may touch the touch sensor at a single point or in a series of points due to motion. Based on the touch data received from the touch sensor, the location of the touch input in terms of touch coordinates relative to the touch sensor is determined.

The rendering/syncing module is configured to accept and process the touch coordinates. This processing may include mapping the touch coordinates to display coordinates associated with the display. For example the touch sensor may have a different coordinate system compared to the display. The rendering/syncing module may be configured to receive the touch coordinates and provide a translation or mapping from the coordinates used by the touch sensor to corresponding points on the display. Based on this translation, display coordinates are generated which are relative to the display.

The rendering/syncing module may then analyze the display coordinates to determine whether to render a feature or not. In one implementation, canvas zones may be designated on the touch sensor and corresponding positions on the display which are areas in which touch input will result in rendering using the rendering/syncing module. In comparison, touch input to non-canvas areas may result in other actions, but will not result in a feature being rendered to the display by the rendering/syncing module.

Details about how the feature is to be rendered by the rendering/syncing module are specified by feature state data. The feature state data may be previously stored, or may be provided by an application to the rendering/syncing module. The feature state data describes where and how the rendering/syncing module may draw directly to the display responsive to touch input. For example, the feature state data may be configured to render touch input corresponding to a particular canvas region as a line having a particular pixel width and color.

Based on the touch input and the feature state data, the rendering/syncing module may render a feature to the display. The rendering/syncing module may then provide information such as the touch input, what was rendered, and so forth to the application. The application may then accept the touch input and act as previously configured. For example, the application may store the line corresponding to the touch input made by the user.

In some implementations, the application may generate application rendering data. The application rendering data may be responsive to the touch input. The application rendering data may modify or replace the previously rendered feature. For example, the application may generate the application rendering data comprising a more complicated pattern associated with a particular type of paintbrush. The application rendering data may be passed from the application to the rendering/syncing module. The rendering/syncing module may then determine whether to overwrite the previously rendered feature with the application rendering data, or discard the application rendering data. To the user, the touch input would result in a quickly rendered feature based on the feature state data, which would then be replaced some time later by the application rendering data from the application. The quickly rendered feature thus provides a fast response to the user, improving the user experience.

Illustrative System

FIG. 1 depicts a system 100 for reducing latency in rendering a feature 122 responsive to touch input 110 on a display device 104. A user 102 may interact with a device 104. The device 104 may include a tablet computer, smartphone, in-vehicle control system, classroom presentation system, and so forth. The device 104 may include a display 106 configured to provide a visual presentation of touch data 112 to the user 102. The device 104 may also include a touch sensor 108. The touch sensor 108 is configured to accept touch input 110 and generate touch data 112. This touch input 110 may comprise the user 102 interacting with the device touch sensor 108 using a finger, a stylus, or other object in such a fashion as to generate a detectable signal. The touch input 110 may comprise a discrete touch such as a tap, or one or more motions such as a user sliding their finger or writing with a stylus on the touch sensor 108.

The touch data 112 may include data indicative of one or more points which have been activated on the touch sensor 108 by the touch input 110. For example, the touch data 112 may comprise a serial stream of coordinates indicative of the touch input 110.

The touch data 112 is provided to a touch controller module 114 which may be part of one or more operating system components. Operating system components include, but are not limited to, one or more of an operating system kernel 116 ("kernel"), operating system module, or device driver. The kernel 116 may include a set of instructions which, when executed by a processor, function as an intermediary between applications and the actual data processing done at the hardware level. The kernel 116 may also be configured to allow communication between hardware and software components. Additionally, the kernel 116 may be configured to manage the resources associated with the device 104 such as, input/output devices, processors, memory and so forth.

The touch controller module 114 is configured to process the touch data 112 into a format which is usable by other portions of the device 104, such as a rendering/syncing module 118. The rendering/syncing module 118 may be configured to receive the touch data 112 as processed by the touch controller module 114. As described above, the touch data 112 may be expressed as a set of coordinates relative to the touch sensor 108. The touch sensor 108 may have a resolution or coordinate system which differs from other components such as the display 106. In a simplified example, the touch sensor 108 may provide touch data 112 using a Cartesian grid of 10×10, while the display 106 has an array of pixels measuring 20×20. The rendering/syncing module 118 may be configured to map the touch coordinates associated with the touch data 112 to display coordinates describing a corresponding location on the display 106. This mapping is discussed in more detail below with regard to FIG. 2.

The rendering/syncing module 118 may also be configured to accept feature state data 120. The feature state data 120 describes where and how the rendering/syncing module 118 may draw one or more features 122 to the display 106, responsive to the touch input 110. The feature state data 120 may designate canvas regions within which touch input 110 is rendered by the rendering/syncing module 118 as the feature 122 on the display 106. Canvas regions are areas in which touch input 110 is rendered to the display 106 using the techniques described herein. The canvas regions are discussed in more detail below with respect to FIG. 5. The feature 122 may comprise one or more points, line segments, or other constructs or shapes. The feature state data 120 is described in more detail below with regard to FIG. 4.

The feature state data 120 may be received from an application framework 124. The application framework 124 is configured to support the execution of one or more applications 126 on the device 104. The application framework 124 may receive the feature state data 120 from one or more of the applications 126. For example, a drawing application may send the feature state data 120 to the rendering syncing module 118. Other data 128 may be exchanged between the kernel 116 and the application framework 124, the application 126, and so forth.

The rendering/syncing module 118 may be configured to generate or render one or more of the features 122 based at least in part on the touch data 112 and the feature state data 120. The rendering of the one or more features 122 is sent to a display controller module 130. For example, the rendering may include instructions or bitmaps which are intended to produce a particular output on at least a portion of the display. 106. The display controller module 130, based on this rendering, generates display data 132. The display data 132 is provided to the display 106, which presents the rendering of the feature 122 on the display 106.

Because the processing of the touch data 112 and subsequent generation of display data 132 occurs within one or more operating system components, such as the OS kernel 116, the overall execution time is minimized. Compared to conventional systems in which the application 126 is implicated in rendering the output for presentation on the display 106, significant reductions in latency are realized. For example, using the techniques described in this disclosure, the time between touch input 110 and display of the feature 122 may be less than 40 milliseconds ("ms"). As a result, the user 102 experiences a relatively immediate response which may result in a positive user experience.

The rendering/syncing module 118 may be configured to provide information back to the application 126. For example, the other data 128 returned to the application 126 may include information such as the touch data 112, coordinates as to where the feature 122 was presented on the display 106, what feature state data 120 was used which is indicative of what was actually presented on the display 106, and so forth.

The rendering/syncing module 118 may be configured to mediate contention for rendering to the same or proximate locations on the display 106. For example, the application 126 may receive the touch data 112. Responsive to the touch data 112, the application 126 may generate application rendering data 134. This application rendering data 134 may be configured to draw to the same or proximate points as those of the feature 122 generated directly by the rendering/syncing module 118.

In one implementation the rendering/syncing module 118 may be configured to drop or not provide to the display 106 data which would overlap or be proximate within a threshold value to the points in the feature 122. For example, the application rendering data 134 which would overwrite the feature 122 may be discarded by the rendering/syncing module 118.

In another implementation the rendering/syncing module 118 may overwrite or override and replace the feature 122 with the application rendering data 134. For example, the feature state data 120 may describe a "pencil" effect which is uncomplicated, while the application 126 may be configured to generate a feature which includes visual effects such as smudge. While drawing on the touch sensor 108, the user 102 may initially see presented on the display 106 the feature 122 a simple line as rendered by the rendering/syncing module 118. After a brief time after which the application 126 has received the touch data 112 and generated the application rendering data 134, the feature 122 comprising the simple line may be replaced with a more complicated rendering which shows the various visual effects such as smudge.

In yet another implementation, the application 126 may be configured to take advantage of the operation of the rendering/syncing module 118. In this implementation, the application 126 may receive data indicating the rendering/syncing module 118 is available. Based on this information, the application 126 may be configured to provide the feature state data 120 to the rendering/syncing module 118 and receive the touch data 112, but not generate application rendering data 134 associated with the feature 122. For example, the application 126 may rely on the rendering/syncing module 118 to draw lines responsive to the touch input 110 within a designated canvas region on the display 106.

Figure 2:
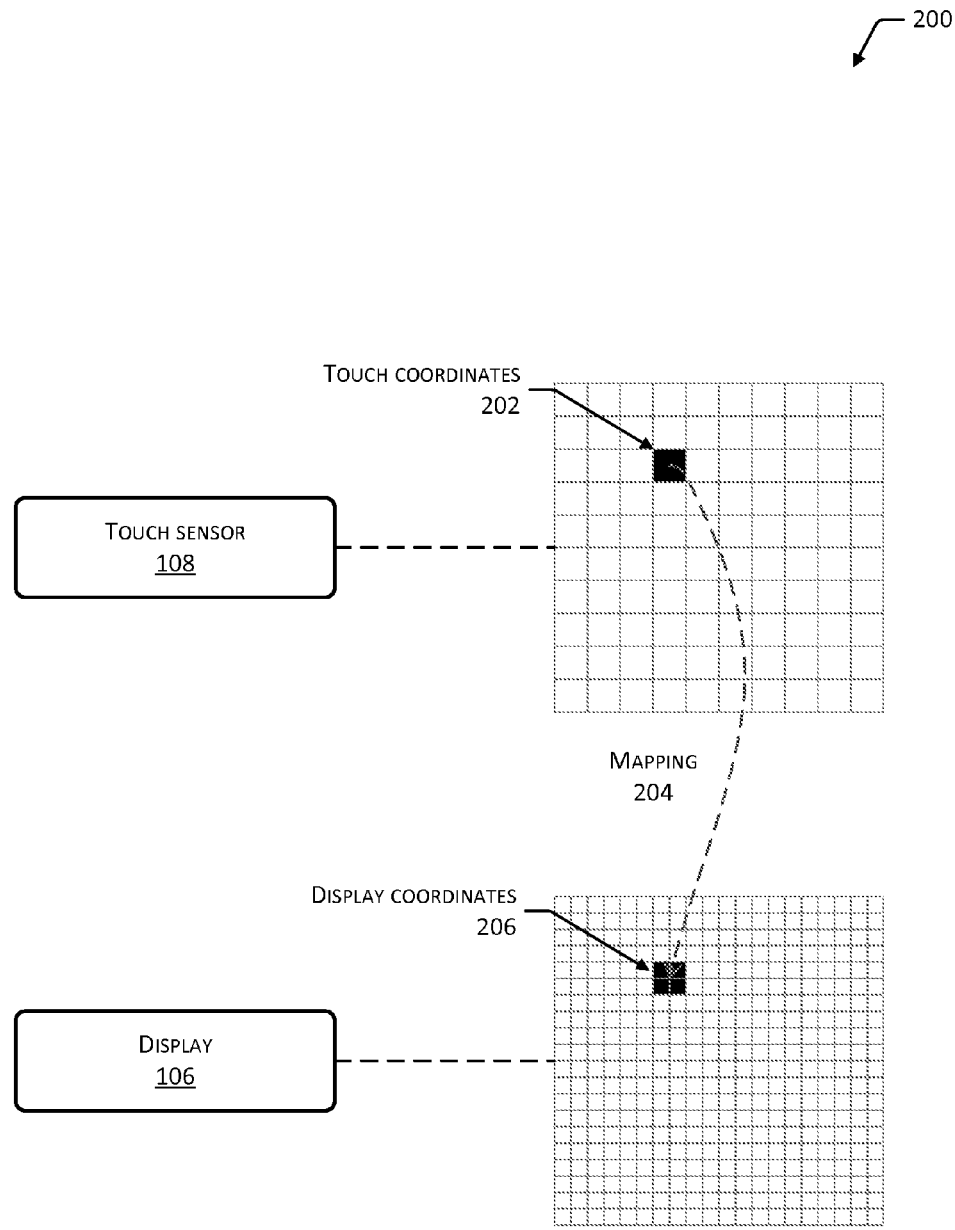
FIG. 2 depicts a mapping between touch coordinates from a touch sensor to display coordinates of a display.

FIG. 2 depicts a mapping 200 between touch coordinates 202 from the touch sensor 108 to display coordinates 206 of the display 106. In some implementations this mapping 204 may be provided by the rendering/syncing module 118. In other implementations other modules may provide this functionality. For example, the touch controller module 114 may be configured to provide this mapping 204 functionality.

As described above, the touch data 112 may be expressed as a set of coordinates relative to the touch sensor 108. The touch sensor 108 may have a resolution or coordinate system which differs from other components such as the display 106. In a simplified example, the touch sensor 108 may provide touch data 112 using a Cartesian grid of 10×10, while the display 106 has an array of pixels measuring 20×20. In actual use, the various resolutions may be significantly greater. For example, the touch sensor 108 may provide touch data 112 with a resolution of 640×480 while the display 106 may have a pixel resolution of 1920×1280.

The touch data 112 which is descriptive of the coordinates of the points on the touch sensor 108 which the touch input 110 has activated is depicted here as the touch coordinates 202. In this example, the touch coordinates 202 comprises a single point at coordinates (4, 8). The mapping 204 translates or otherwise relates the touch coordinates 202 with display coordinates 206. The display coordinates 206 corresponds to locations within the display 106 during presentation of an image, such as the feature 122. For example, the display coordinates 206 may comprise pixel locations.

Continuing the example depicted here, without the mapping 204, use of the coordinates (4, 8) would result in rendering of the features 122 at a position which differs from the touch input 110 of the user 102. However, with the mapping 204, the feature 122 is generated by the rendering/syncing module 118 at the apparent point on the display 106 which corresponds to the touch input 110. In this example, the feature 122 is mapped to a rectangle bounded by points (7, 15) and (8, 14).

The touch coordinates 202 and the display coordinates 206 may comprise one or more coordinates. For example, a motion such as a swipe or a line on the touch sensor 108 may result in touch data 112 which includes a list of points and their associated coordinates. Furthermore, as illustrated here, the mapping may include expansion or contraction, such as mapping the single point in the touch coordinates 202 to a plurality of points in the display coordinates 206, or vice versa.

Figure 3:
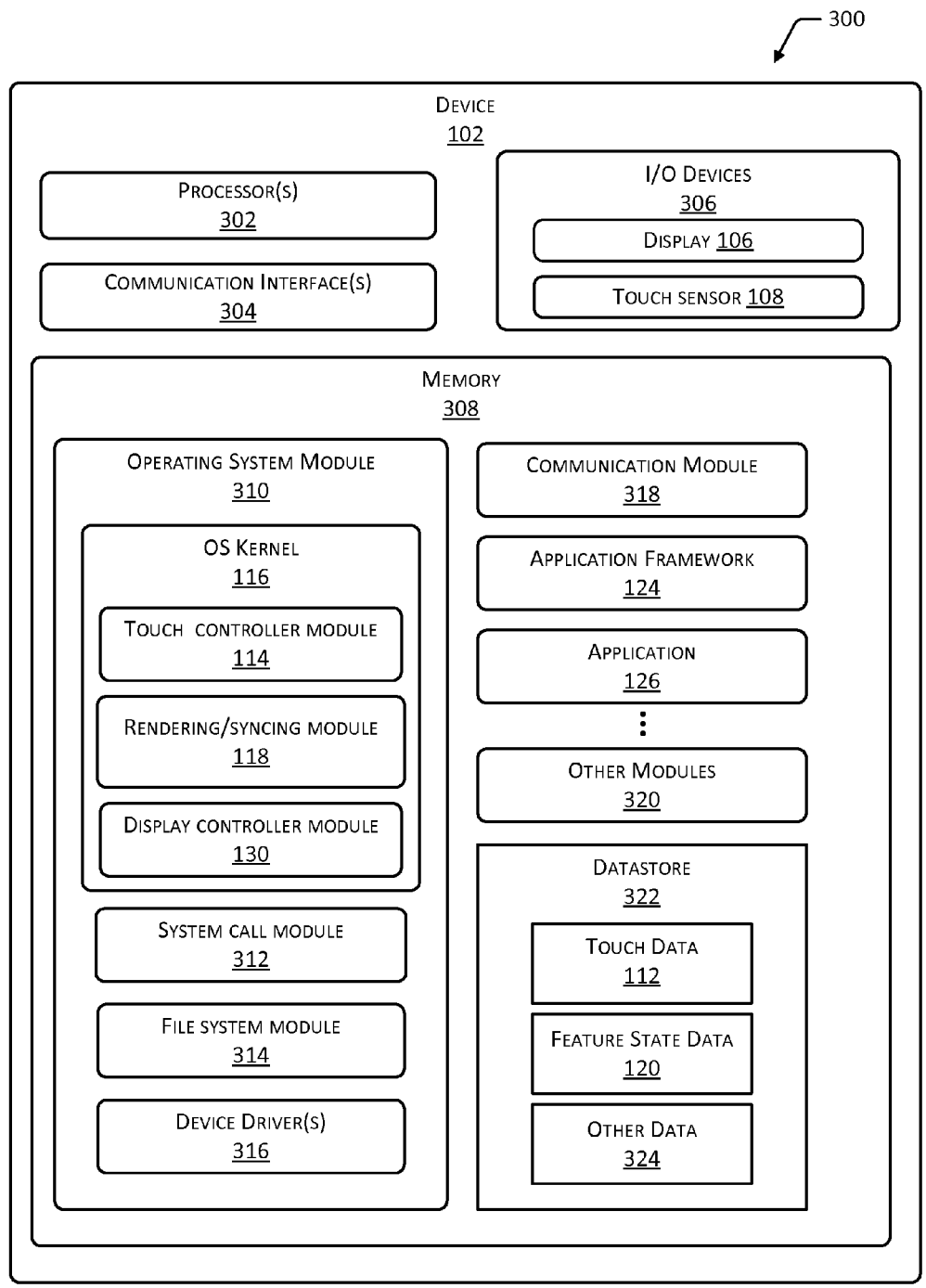
FIG. 3 depicts a block diagram of a device configured use the rendering/syncing module.

FIG. 3 depicts a block diagram 300 of a device 104 configured to use the rendering/syncing module 118. The device 104 may include one or more processors 302 configured to execute one or more stored instructions. The processors 302 may comprise one or more cores. The device 104 may include one or more communication interfaces 304 to allow the processor 302 or other portions of the device 104 to communicate with other devices.

The communication interfaces 304 are configured to provide communications between two or more devices 104 and other devices, such as routers, access points, client computing devices, servers, and so forth. The communication interfaces 304 may connect to one or more network(s), such as personal area networks ("PANs"), wired and wireless local area networks ("LANs"), wide area networks ("WANs"), wireless wide area networks ("WWANS"), and so forth. For example, Ethernet, Wi-Fi, 3G, 4G, and so forth.

The communication interfaces 304 may couple to one or more I/O devices 306. The I/O devices 306 may include one or more displays 106, touch sensors 108, haptic output devices, audio output speakers, and so forth. A touchscreen is an example of an I/O device 306 comprising the display 106 and the touch sensor 108. The display 106 may include liquid crystal displays, interferometric displays, electrophoretic displays, electrowetting displays, cholesteric displays, light emitting diode displays, and so forth. In some implementations the display 106 may also utilize image projection systems having liquid crystal displays, digital micromirror devices, microelectromechanical (MEM) spatial light modulators, liquid crystal on silicon displays, light emitting diodes, lasers, and so forth.

The touch sensor 108 may include a resistive sensor, surface acoustic wave sensor, capacitive sensor, optical sensor, and so forth. For example, in some implementations, the touch sensor 108 may generate an optical signal and determine touch input 110 based on modification of internal reflectance of a later. The touch sensor 108 may be configured to generate location information or coordinates indicating the position of the touch input 110 on the touch sensor 108 surface. In other implementations the touch sensor 108 may comprise a depth camera or other device configured to determine the position of the user 102 or another object in space. In these implementations the touch input 110 may be determined based on proximity to another object or position in space. For example, the touch input 110 may comprise the user 102 placing a finger on the surface of a wall, and the touch data 112 may comprise information from a depth camera determining the location of a finger is within a threshold distance of the wall.

The I/O devices 306 may be physically incorporated with the device 104 or may be externally placed. The device 104 may also include one or more busses or other internal communications hardware or software that allow for the transfer of data between the various modules and components of the device 104.

As shown in FIG. 3 the device 104 includes one or more memories 308. The memory 308 may comprise one or more computer-readable storage media ("CRSM"). The CRSM may be any one or more of an electronic storage medium, a magnetic storage medium, an optical storage medium, a quantum storage medium, a mechanical computer storage medium, and so forth. The memory 308 provides storage of computer readable instructions, data structures, program modules, and other data for the operation of the device 104. Also stored in the memory 308 may be one or more of the following modules. These modules may be executed as foreground applications, background tasks, daemons, and so forth.

The memory 308 may include at least one operating system ("OS") module 310. The OS module 310 is configured to manage hardware resource devices such as the communication interfaces 304, the I/O devices 306, coordinate timing of different processes, and provide various services to applications or modules executing on the one or more processors 302. The kernel 116 is present within the OS module 310. As described above, the kernel 116 be configured to provide services to other parts of the operating system including memory management, process management, file management and I/O management (i.e., accessing the peripheral devices), and so forth.

The kernel 116 may also include the touch controller module 114. The touch controller module 114 may be implemented to convert the information provided by the touch sensor 108 into information the device 104 can receive.

The kernel 116 may also include a rendering/syncing module 118. The rendering/syncing module 118 may be configured to obtain information from the touch controller module 114 and to render the feature 122 corresponding to the movement of the user's finger, stylus, or other object for display via the display controller module 130.

The rendering/syncing module 118 may be configured to provide anti-aliasing functionality. This anti-aliasing functionality may be applied to the rendered feature 122 to provide edge smoothing to the feature 122 as rendered. The anti-aliasing functionality may be used to smooth and prevent the features 122 from having a jagged appearance along the edges. In one implementation, the pixels surrounding the edges of a line in the feature 122 may be modifying by varying shades of gray or color in order to blend the sharp edge into the background.

The rendering/syncing module 118 may be configured to transfer the touch data 112 or information derived therefrom to one or more modules of the device 104. For example, the rendering/syncing module 118 may pass the touch data 112 to the application 126.

The kernel 116 may also include the display controller module 130. The display controller module 130, based on the rendering provided by the rendering/syncing module 118, generates the display data 132. For example the display controller module 130 may also be configured to update the pixels of the display 106 in response to the information received from the rendering/syncing module 118.

In other implementations one or more of the touch controller module 114, the rendering/syncing module 118, or the display controller module 130 may be in the OS module 310 but outside of the OS Kernel 116. For example, the rendering/syncing module 118 may be an operating system process.

The OS module 310 may also include a system call module 312. The system call module 312 may be configured to process requests for a service from kernel 116. This may include hardware related services (e.g. accessing the hard disk), creating and executing new processes, and so forth. The OS module 310 may also include a file system module 314. The file system module 314 may be configured to store, retrieve, and update files. The file system module 314 may be configured to manage access to both the content of files and the metadata associated with those files. One or more device drivers 316 may also be present. The device drivers are configured to operate or control a particular device which is coupled to the processor or another portion of the device 104.

The communication module 318 is configured to maintain one or more of the communication paths with other devices. The communication module 318 may be configured to send, receive, or send and receive data with another device 104, a server, and so forth using one or more of the communication interfaces 304.

The application framework 124 may also be stored in the memory 308. The application framework 124 is configured to support the execution of one or more applications 126 on the device 104. For example, the application framework 124 may comprise a plurality of libraries or executable modules which may provide functionality to one or more of the applications 126.

The application 126 may comprise code or instructions which, when executed, provide one or more functions. The application 126 may comprise an electronic book ("eBook") reader application, a drawing application, a note taking application, a word processing application, a web browser application, and so forth.

Other modules 320 may also be present, such as a handwriting recognition module. The handwriting recognition module may be configured to process the touch data 112 and attempt to determine one or more letters, numbers, or other symbols.

The modules in this disclosure are described as separate modules for convenience, and not by way of limitation. In some implementations at least a portion of the functionality of these modules may be combined into a single module, incorporated into another module, and so forth.

The memory 308 may also include a datastore 322 to store information. The datastore 322 may use a flat file, database, linked list, tree, or other data structure to store the information. In some implementations, the datastore 322 or a portion of the datastore 322 may be distributed across one or more other devices such as servers, other devices 104, network attached storage devices, and so forth.

The datastore 322 may also store one or more of the touch data 112, or the feature state data 120 described above. Other data 324, such as control data, user preferences, user interface elements, and so forth, may also be stored in the datastore 322.

Figure 4:
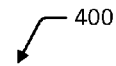
FIG. 4 depicts a schematic of feature state data used by the rendering/syncing module to render a line or other feature on a display.

FIG. 4 depicts a schematic 400 of feature state data 120 that may be used by the rendering/syncing module 118. The feature state data 120 describes where and how the rendering/syncing module 118 may draw one or more features 122 to the display 106, responsive to the touch input 110.

The feature state data 120 may include one or more feature characteristics 402. The feature characteristics 402 depicted here are illustrative and are not to be construed as limiting. The feature characteristics 402 may include attributes such as, line thickness, line style, color, canvas region, input object, and so forth. For example, the line thickness attribute may be the ratio of the thickness of the outline of the feature 122 relative to the height of the feature 122. The line style attribute may define the style of the feature 122 as chalk, pencil, marker, crayon, and so forth. The color attribute may include data indicative of the color of the feature 122. The input object attribute may be used to distinguish between different objects used to provide the touch input 110. For example, the input object attribute may a finger, stylus, particular stylus point, or any object. The feature characteristics 402 in the feature state data 120 may thus define how the rendering/syncing module 118 will render the feature 122 on the display 106.

The feature state data 120 may include information relating to where the feature 122 should be drawn or written responsive to touch input 110. As illustrated here, the feature characteristics 402 may include the canvas region attribute. The canvas regions are areas in which touch input 110 is rendered to the display 106 using the techniques described herein. The canvas region attribute may specify coordinates or otherwise define one or more areas on the touch sensor 108, the display 106, and so forth. The canvas regions are described in more detail below with regard to FIG. 5.

In this illustration, two pieces of feature state data 120(1) and 120(2) are depicted. The feature state data 120(1) specifies a line thickness of 8 points, line style of "Pencil", color of "BLUE", designates a rectangular canvas region extending from coordinates (0,0) to (312,50) with reference to the display 106, and specifies that this feature state data 120(2) applies to an input object of "any". In comparison, the feature state data 120(2) specifies a line thickness of 10 points, line style of "felt tip pen", color of "BLACK", designates a rectangular canvas region extending from coordinates (225,25) to (525,125) with reference to the display 106, and that this feature state data applies to inputs from an input object of the type "stylus". Continuing the example, the inputs from an input object of the type "finger" which are made in the rectangular canvas region extending from coordinates (225, 25) to (525,125) with reference to the display 106, the feature state data 120(3) specifies a line thickness of 10 points, line style of "thick marker", and color of "GREEN". The application of these pieces of feature state data 120 by the rendering/syncing module 118 is illustrated in more detail below with regard to FIG. 5.

Different features 122 may share the same feature state data 120. For example, within a particular canvas region the letters written by the user 102 may all use common feature state data 120. In some implementations, the feature state data 120 may vary from one feature 122(1) to another feature 122(2). For example, within the same canvas region one feature 122(1) may be a continuous line while another feature 122(2) may be a dotted line.

While the feature state data 120 is depicted as a table, in other implementations other data structures may be used to store the information. For example, the feature state data 120 may be stored as one or more of program code, executable binary, a table, array, linked list, and so forth.

Figure 5:
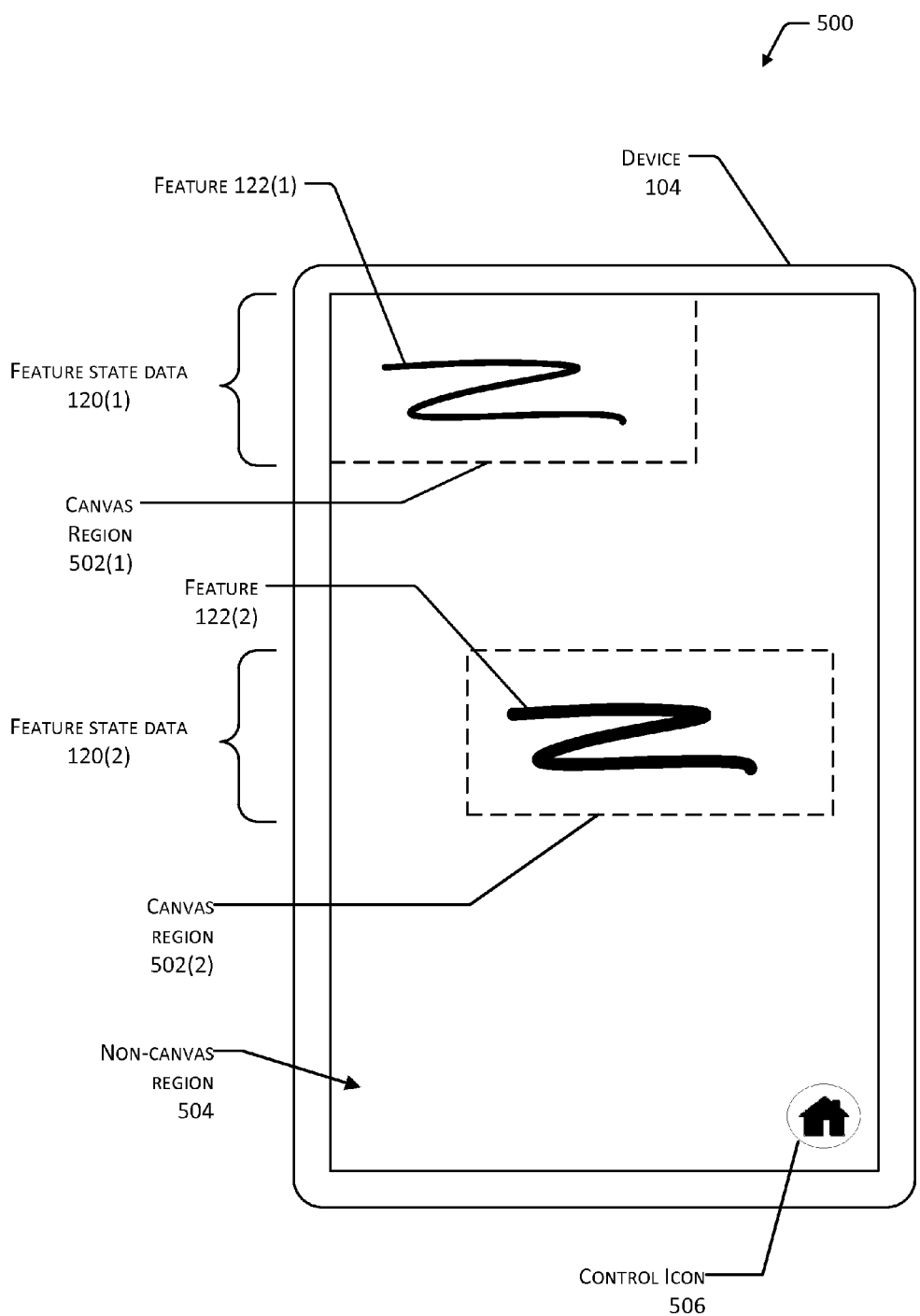
FIG. 5 illustrates a user interface of a device configured with canvas regions in which touch inputs are rendered as one or more features.

FIG. 5 illustrates a user interface 500 of the device 104 configured with canvas regions 502 in which touch inputs 110 are rendered by the rendering/syncing module 118 as one or more features 122 on the display 106. As described above, the device 104 includes a display 106 and a touch sensor 108. In this illustration the display 106 and the touch sensor 108 are configured to form a touchscreen. For example, the touch sensor 108 may be arranged atop the display 106.

Depicted here with broken lines are two canvas regions 502. In some implementations no canvas region 502 may be present in the user interface, while in other implementations more than two canvas regions 502 may be present. Furthermore, while the canvas regions 502 are depicted as rectangular, in other implementations the canvas region 502 may describe another polygonal or irregular shape.

The canvas region 502 defines an area within which touch input 110 is rendered by the rendering/syncing module 118 as the feature 122 on the display 106. Within the canvas region 502, the feature 122 is, at least initially, rendered to the display 106 without immediate intervention by the application 126. For touch data 112 associated with points within the canvas region 502, the rendering/syncing module 118 renders the feature 122 which is drawn to the display 106.

As illustrated here, the canvas region 502(1) is associated or specified by the feature state data 120(1). The touch input 110 made in this area results in the feature 122(1) being rendered by the rendering/syncing module 118, and subsequent presentation on the display 106. However, the exact same series of motions made in the canvas region 502(2) will result in the feature 122(2). As shown here, due to the feature state data 120(2) which is associated with the canvas region 502(2), the feature 122(2) is thicker and darker.

In comparison to the canvas regions 502, the rendering/syncing module 118 does not render the touch data 112 in non-canvas regions 504. Rather, the touch data 112, or data indicative thereof, may be passed along to the application 126. For example, the control icon 506 is presented in the non-canvas region 504 depicted here. Should the user 102 slide a stylus across the touch sensor 108 proximate to the control icon 506, no line or other feature 122 would be drawn by the rendering/syncing module 118 to the display 106. However, touch input 110 within the non-canvas region 504 may be processed. Continuing the example, the user's 102 tap with a finger or stylus of the control icon 506 may result in the activation of a particular function, such as changing the user interface 500 to display a home menu.

The rendering/syncing module 118 may thus be configured to, based on the feature state data 120, control the actions, operations, and so forth that occur in each of the canvas regions 502. The rendering/syncing module 118 may also be configured to grant access to the application 126 to perform functions in each of the canvas regions 502(1) and 502(2). For example, the application 126 may place user interface controls within the canvas areas 502 and receive the touch data 112 corresponding to those user interface controls.

The application 126 may perform actions such as generating and providing application rendering data 134 within the canvas regions 502. For example, the application 126 may redraw the feature 122 using a more precise rendering model. As described above, the rendering/syncing module 118 may be configured to control access to the canvas regions 502.

In some implementations, the application 126 may be prohibited from performing actions such as overwriting, updating, or otherwise modifying pixels within the canvas region 502. For example, the rendering/syncing module 118 may be configured to discard application rendering data 134 provided by the application 126, in favor of retaining the initial feature 122 as generated by the rendering/syncing module 118.

Figure 6:
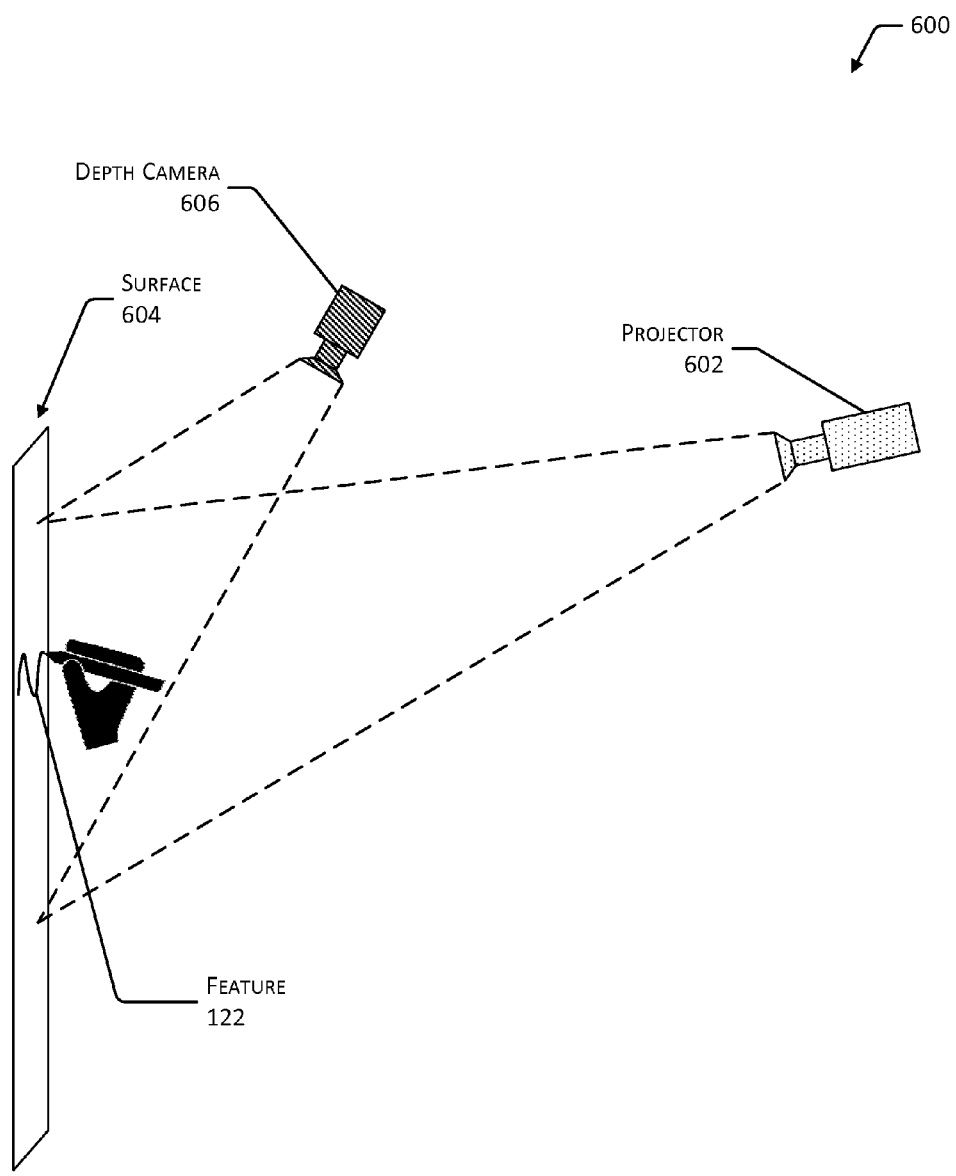
FIG. 6 depicts an environment in which a projector provides an image and touch input is rendered as one or more features by the rendering/syncing module.

FIG. 6 depicts an alternative environment 600 in which one or more features 122 may be rendered by the rendering/syncing module 118. In some implementations, the display 106 may comprise a projector 602 configured to present an image on a surface 604. For example, a digital micromirror device may be configured to project an image on a projection surface. In one implementation the surface 604 may incorporate one or more touch sensors 108, such as described above.

In another implementation, a depth camera 606 or other device is configured to determine the position of the user 102, or another object, in space. In this implementation, the touch input 110 may be determined based on proximity of one object to another object, or a position in space. For example, the touch input 110 may comprise the user 102 placing a finger on the surface 604. Based on the proximity of the finger to the surface 604 within a threshold distance, data from the depth camera 606 indicating this proximity may be used to generate touch data 112. In some implementations, free space gestures may be interpreted as touch input 110 and rendered by the rendering/syncing module 118 as described herein.

The rendering/syncing module 118 may be configured to render the feature 122 associated with the touch input 110 for display at a position corresponding to the location of the touch input 110 on the surface 604. For example, the user 102 may use a finger and the image projected by the projector 602 to "draw" lines or write text on the surface 604.

Figure 7:
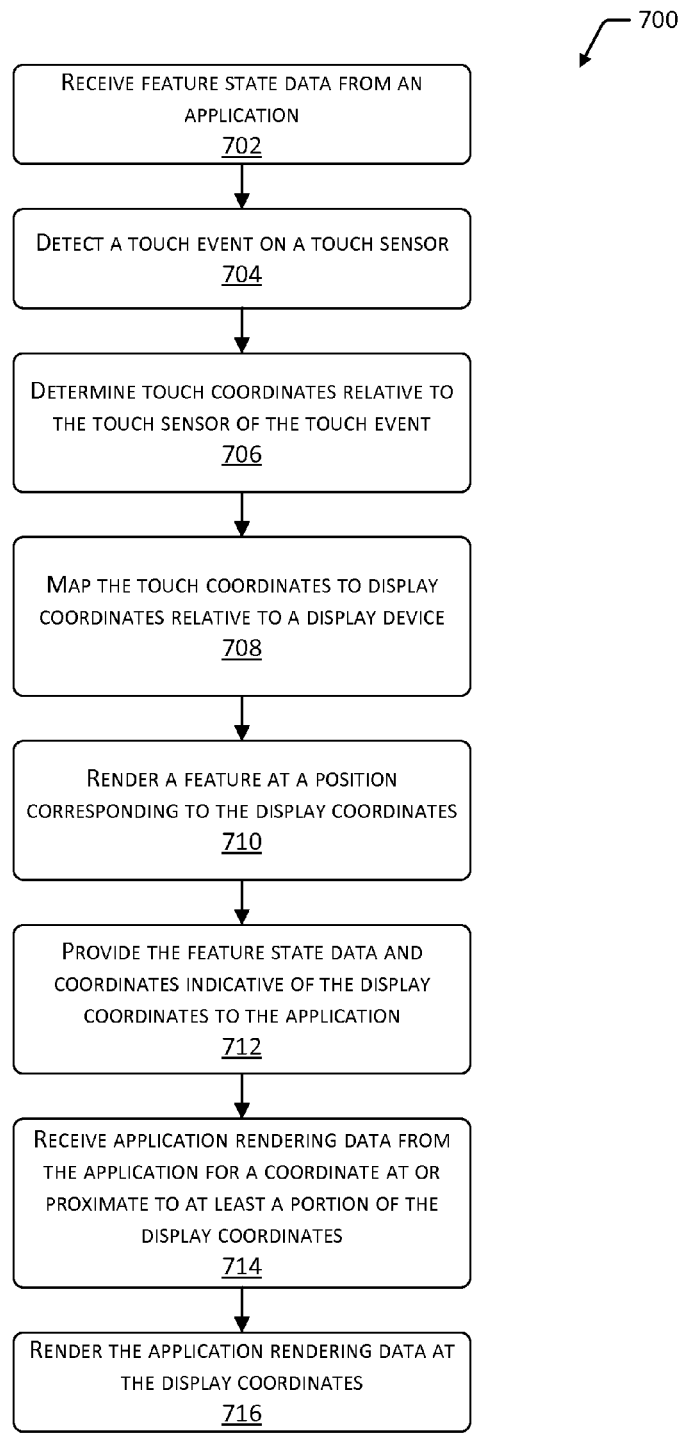
FIG. 7 depicts a flow diagram of a process of receiving a touch input and rendering a feature associated with the touch input on a display.

FIG. 7 depicts a flow diagram 700 of a process by the rendering/syncing module 118 to the feature 122 at a location on the display 106 corresponding to the touch coordinates 202 associated with the touch input 110. One or more of the following blocks may be implemented by one or more operating system components. The operating system components may include one or more of the OS kernel, 116, the operating system module 310, the device driver 316, and so forth.

At block 702, at least a portion of the feature state data 120 is received from the application 126. The feature state data 120 may comprise data indicating how and where to generate the feature 122. As described above, the feature state data 120 may include one or more attributes such as a line thickness, a pen effect, an edge smoothness, a line color, a shading effect, a line texture, predefined canvas regions, and so forth.

At block 704, the touch sensor 108 detects a touch event based on the touch input 110 when a user 102 interacts with the touch sensor 108 of the device 104. For example, touch event may include a touch-down event. A touch-down event occurs when a finger, stylus, or other object comes in contact with the touch sensor 108 sufficient to generate touch data 112 on the touch sensor 108.

At block 706, the touch controller module 114 determines one or more touch coordinates 202 relative to the touch sensor 108. In one implementation, the touch controller module 114 may scan the touch sensor 108 to determine the touch coordinates 202 corresponding to the location of a finger, a stylus, or other object relative to the touch sensor 108. For example, the touch coordinates 202 may specify the point at which the touch event begins on the touch sensor 108 is at X-Y coordinates (51, 17). The touch coordinates 202 associated with the location of the touch input 110 may be provided to the rendering/syncing module 118. Continuing the example, the touch controller module 114 may send data indicating the (51, 17) coordinates to the kernel 116.

At block 708, the touch coordinates 202 are mapped to display coordinates 206 associated with the display 106. As described above with regard to FIG. 2, the touch sensor 108 and the display 106 may have different coordinate systems, resolutions, and so forth. For example, the touch sensor 108 may provide touch data 112 using a Cartesian grid of 100×300, while the display 106 has an array of pixels measuring 600×1800. The touch coordinates 202 from the touch sensor 108, such as (51, 17), may thus be mapped to correspond to the coordinates of the display 106, such as (306, 102). This mapping 204 helps retain continuity between the apparent location at which the touch input 110 by the user 102 takes place on the touch sensor 108 and the apparent location of the feature 122 as presented on the display 106.

At block 710, the rendering/syncing module 118 may be configured to render a feature 122 at a position corresponding to the display coordinates 206. The rendered feature 122 may be provided to the display controller module 130. The display controller module 130 is configured to generate display data 132 based on the rendering received from the rendering/syncing module 118. This display data 132 is then used to draw the feature 122 or other images on the display 106. The rendered feature 122 is thus drawn to the display 106 without implicating the application 126.

Continuing the example, a dot, line segment, or other feature 122 may be drawn on the display 106 at display coordinates (306,102). As the touch input 110 continues, and for the canvas regions 502 in which the feature state data 120 enables this functionality, the features 122 may be drawn which correspond to the relative movements of a user's 102 finger, stylus, or other object across the touch sensor 108.

At block 712, one or more of the feature state data 120, the display coordinates 206, or other coordinates indicative of the display coordinates 206 which are associated with the feature 122 may be provided to the application 126. In this fashion, the application 126 is informed as to what has been drawn to the display 106. In other implementations other information indicative of the rendering of the feature 122 on the display 106 by the rendering/syncing module 118 may be provided.

In some implementations, the rendering/syncing module 118 may transmit the feature 122 and the set of coordinates to the application 126 after a predefined amount of time has elapsed since the occurrence of the touch event. For example, the rendering/synching module 118 may send the data 10 milliseconds after the touch event is detected, such as a touch-up at the completion of a stroke.

In another implementation, the feature 122 and the touch coordinates, the display coordinates, or both may be provided to other modules at regular or irregular intervals as the user 102 moves a finger or stylus along the touch sensor 108. For example, an ongoing stream of the coordinates from the touch controller module 114 may be provided to the application 126.

At block 714, application rendering data 134 may be received from the application 126 for coordinates at or proximate to at least a portion of the display coordinates 206. For example, the application 126 may perform actions such as generating the application rendering data 134 based on the display coordinates 206. As described above, the application rendering data 134 may be configured to provide a more detailed rendering which replaces or supplements the feature 122 previously rendered by the rendering/syncing module 118.

At block 716, the application rendering data 134 may be presented on the display 106 at the display coordinates 206. For example, the application 126 may have sent application rendering data 134 which will darken the feature 122 or otherwise modify presentation of the feature 122 on the display 106. The application 126 may also superimpose additional elements onto the feature 122. Continuing the example, the application 126 may add a smudge or other visual effects to the feature 122.

By using the techniques described in this process, the user 102 perceives an almost immediate response to the touch input 110. Reduction in the latency between input and rendering on the display 106 may improve the overall user experience. For example, compared to conventional techniques, the techniques described herein may reduce the latency to less than 30 milliseconds.

Figure 8:
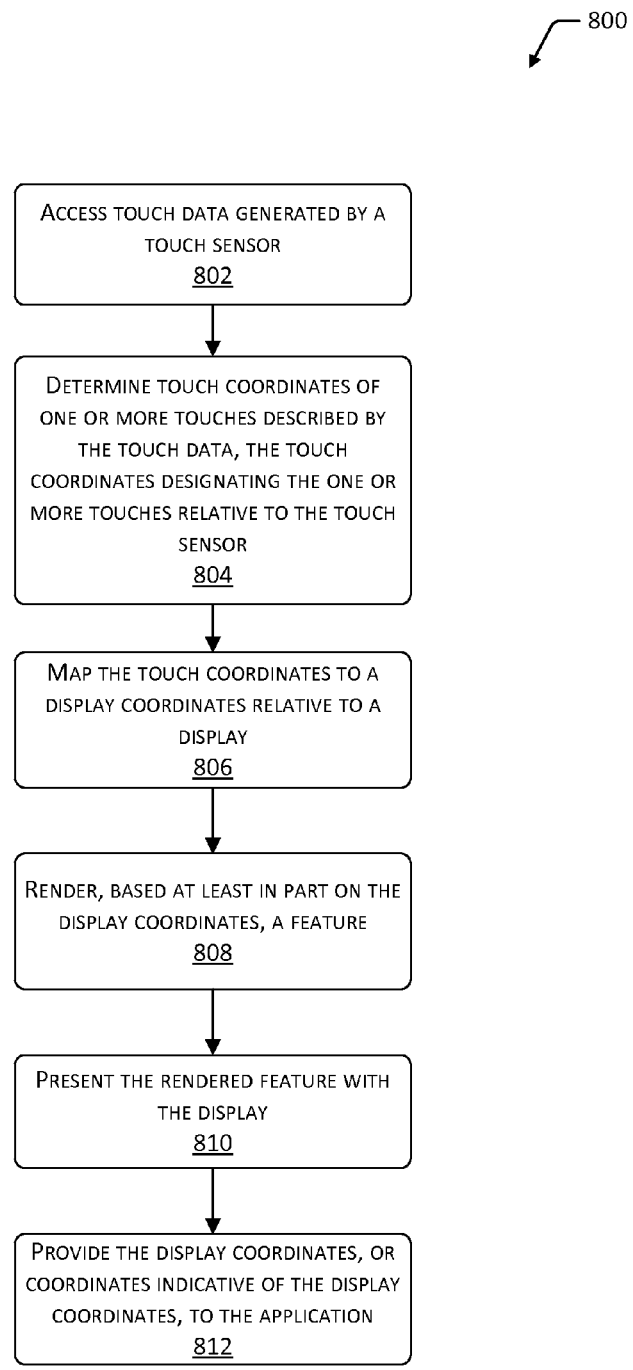
FIG. 8 depicts a flow diagram of an alternative process of rendering a feature on a display based on touch input.

FIG. 8 depicts a flow diagram 800 of a process of rendering the feature 122 associated with the touch input 110 received by the touch sensor 108 to the display 106. This process may be implemented at least in part using the rendering/syncing module 118 described above. One or more of the following blocks may be implemented by one or more operating system components. As described above, the operating system components may include one or more of the OS kernel, 116, the operating system module 310, the device driver 316, and so forth.

At block 802, touch data 112 generated by the touch sensor 108 is accessed. As described above, in some implementations the touch sensor 108 may be coupled to the display 106 to form a touchscreen.

At block 804, touch coordinates 202 of one or more touch inputs 110 described by the touch data 112 are determined. As described above, the touch coordinates 202 are relative to the touch sensor 108. The touch coordinates may express one or more points upon which the touch input 110 is received. For example, the touch sensor 108 may be scanned to determine the locations of the touch inputs 110 made by a finger, a stylus, or other object. As a result of this scan, the touch coordinates 202 may be determined.

At block 806, the touch coordinates 202 from the touch sensor 108 are mapped to display coordinates 206. The display coordinates 206 are relative to the display 106. For example, the touch sensor 108 may provide touch data 112 using a Cartesian grid of 100×300, while the display 106 has an array of pixels measuring 600×1800. The touch coordinates 202 from the touch sensor 108, such as (51, 17), may thus be mapped to correspond to the coordinates of the display 106, such as (306,102). The mapping 204 thus associates one or more points on the touch sensor 108 with one or more corresponding points on the display 106.

At block 808, based at least in part on the display coordinates 206, one or more features 122 are rendered. As described above, in some implementation the rendering may further be based on the feature state data 120. The feature state data 120 used in the rendering may be provided by the application 126, as a default, or by another module.

At block 810, the rendered feature 122 is presented on the display 106. For example, the display data 132 based on the rendering provided by the rendering/syncing module 118 may be used to update a display buffer of the display controller module 130, which in turn presents the feature 122 on the display 106.

At block 812, the display coordinates 206 or coordinates indicative of the display coordinates 206 may be provided to the application 126. For example, the application 126 may be provided with the points, relative to the display 106, in which the features 122 have been rendered. In some implementations the feature state data 120 associated with the display coordinates 206 may also be provided to the application 126. In other implementations, the information about one or more of the display coordinates 206, the feature state data 120, and so forth may be provided to other modules or processes.

Those having ordinary skill in the art will readily recognize that certain steps or operations illustrated in the figures above can be eliminated or taken in an alternate order.

Moreover, the methods described above may be implemented as one or more software programs for a computer system and are encoded in a computer readable storage medium as instructions executable on one or more processors. The methods described above may also be implemented at least in party in hardware. For example, the rendering/synching module 118 may be implemented as an application specific integrated circuit or other dedicated hardware.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A non-transitory computer readable medium comprising:
   an operating system,
   an operating system kernel present within the operating system,
   wherein the operating system kernel includes a display controller, a rendering/syncing module, and a touch controller,
   wherein the operating system kernel further includes a set of storing instructions, which when executed by a processor, cause the processor to perform actions comprising:
      receiving, with the rendering/syncing module operating system kernel, feature state data from an application, the feature state data indicating a canvas region associated with one or more of a display device or a touch controller;
      receiving, with the rendering/syncing module operating system kernel, touch coordinates from the touch controller, wherein the touch coordinates are indicative of a location of a touch input relative to a touch sensor;
      mapping, with the rendering/syncing module operating system kernel, the touch coordinates to display coordinates, wherein the display coordinates are related to the display device;
      rendering, with the rendering/syncing module operating system kernel, a feature associated with the touch input for display on the display device at a position corresponding to the display coordinates, wherein the feature is based at least in part on the feature state data and the display coordinates;
      providing, with the rendering/syncing module operating system kernel, the display coordinates to the application upon a detection of a touch-up event, wherein the application is configured to store the display coordinates;
      receiving, with the rendering/syncing module, application rendering data from the application; and determining, with the rendering/syncing module, based on a lack of correspondence between the canvas region and one or more of the touch coordinates corresponding to the display coordinates are not included within the canvas region; and modifying, with the rendering/syncing module, the feature based on the application rendering data.

2. The non-transitory computer readable medium of claim 1, wherein the operating system kernel functions as an intermediary between the application and manages resources associated with the touch controller and the display device.

3. The non-transitory computer readable medium of claim 1, wherein the feature state data comprises data indicative of one or more of the following:
   a line thickness;
   a line color;
   an edge smoothness;
   a pen effect; or
   a canvas region.

4. The non-transitory computer readable medium of claim 1, further comprising the operating system kernel rendering/syncing module preventing the application from overwriting the rendered feature based on correspondence between the canvas region and the one or more of the touch coordinates corresponding to the display coordinates.

5. The non-transitory computer readable medium of claim 1, wherein the application is further configured to render a second feature for display on the display device at the position corresponding to the display coordinates.

6. A system comprising:
   at least one display;
   at least one touch sensor;
   at least one processor; and
   at least one memory coupled to the at least one display, the at least one touch sensor, and the at least one processor,
   wherein the memory includes an operating system and an operating system kernel within the operating system, wherein the operating system kernel includes a display controller, a rendering/syncing module, and a touch controller,
   the at least one memory storing instructions configured for execution on the at least one processor, the instructions implemented by the rendering/syncing module within the comprising an operating system kernel configured to:
   access feature state data indicative of a canvas region associated with a first portion of one or more of the at least one display or the at least one touch sensor, wherein a second portion of the one or more of the at least one display or the at least one touch sensor includes a non-canvas region;
   access touch data generated by the at least one touch sensor;
   determine touch coordinates of one or more touches described by the touch data, wherein the touch coordinates are relative to the at least one touch sensor;
   map the touch coordinates to display coordinates, wherein the display coordinates are relative to the at least one display; render one or more features based at least in part on the display coordinates;
   present the rendered one or more features on the at least one display at a position corresponding to the display coordinates;
   determine whether based on a lack of correspondence between the canvas region and one or more of the touch coordinates corresponding to the display coordinates are not included within the canvas region; and
   receive application rendering data from an application indicative of at least one feature to be rendered and render the at least one feature in the non-canvas region.

7. The system of claim 6, further comprising instructions configured to:
   based on correspondence between the canvas region and the one or more of the touch coordinates corresponding to the display coordinates, disregard the application rendering data.

8. The system of claim 6,
   wherein the rendering of the one or more features is allowed for coordinates within the canvas region and disallowed for the coordinates outside of the canvas region.

9. The system of claim 6, further comprising instructions configured to:
   determine a touch event in the touch data; and
   based on the determination of the touch event, store the display coordinates to a memory location accessible by the application.

10. The system of claim 6, further comprising instructions configured to:
    determine a touch event in the touch data; and
    based on the determination of the touch-up event, provide the display coordinates to the application after a predefined amount of time.

11. The system of claim 6, further comprising instructions configured to:
    disallow the application to overwrite the one or more features in the canvas region.

12. The system of claim 6, further comprising instructions to:
    allow the application to overwrite the one or more features presented in the non-canvas region.

13. The system of claim 6, the instructions further configured to:
    provide the display coordinates to the application.

14. A computer implemented method:
    providing within an operating system, an operating system kernel, wherein the operating system kernel comprises a display controller, a rendering/syncing module, and a touch controller,
    accessing, with the rendering/syncing module, feature state data indicative of a canvas region and an application control within the canvas region;
    accessing, with the rendering/syncing module operating system kernel, touch data generated by a touch sensor;
    determining, with the rendering/syncing module operating system kernel, touch coordinates associated with the touch data, wherein the touch coordinates designate a location relative to the touch sensor;
    mapping, with the rendering/syncing module operating system kernel, the touch coordinates to display coordinates, wherein the display coordinates designate a location on a display device;
    determining, with the rendering/syncing module, whether based on a lack of correspondence between the application control and one or more of the touch coordinates corresponding to the display coordinates are within the application control;
    rendering, with the rendering/syncing module, operating system kernel, one or more features for presentation on the display device when the one or more of the touch coordinates corresponding to the display coordinates are not included within the application control; and based on correspondence between the application control and the one or more of the touch coordinates or the display coordinates, providing, with the rendering/syncing module, operating system kernel, one or more of the touch coordinates corresponding to the display coordinates to an application when the one or more of the touch coordinates corresponding to the display coordinates are included within the application control.

15. The computer implemented method of claim 14, wherein the operating system kernel functions as an intermediary between the application and manages resources associated with a touch controller and the display device.

16. The computer implemented method of claim 14, further comprising:

detecting a touch-up event in the touch data; and
wherein the providing one or more of the touch coordinates corresponding to the display coordinates to the application is based at least in part on the detecting.

17. The computer implemented method of claim 14, further comprising:

detecting a touch-up event in the touch data; and
wherein the providing one or more of the touch coordinates corresponding to the display coordinates to the application occurs at a predetermined elapsed time following the detection of the touch-up event.

18. The computer implemented method of claim 14, further comprising:

disallowing overwrite by the application of pixels within the canvas region.

19. The computer implemented method of claim 14, wherein the rendering the one or more features is based at least in part on style characteristics indicated in the feature state data received from the application.

20. The computer implemented method of claim 19, wherein the feature state data comprises information indicative of one or more of the following:

a line thickness;
a line color;
an edge smoothness;
an pen effect; or
a canvas region.

* * * * *